(12) United States Patent
Okuda et al.

(10) Patent No.: US 7,555,955 B2
(45) Date of Patent: Jul. 7, 2009

(54) ULTRASONIC SENSOR

(75) Inventors: Yasuyuki Okuda, Aichi-gun (JP);
Takahiko Yoshida, Okazaki (JP);
Ryonosuke Tera, Toyota (JP); Akio Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 242 days.

(21) Appl. No.: 11/602,260

(22) Filed: Nov. 21, 2006

(65) Prior Publication Data
US 2007/0157731 A1 Jul. 12, 2007

(30) Foreign Application Priority Data
Jan. 11, 2006 (JP) ............................. 2006-003512

(51) Int. Cl.
*G01S 15/93* (2006.01)
(52) U.S. Cl. .................. 73/632; 310/322; 310/334
(58) Field of Classification Search ............... 73/632, 73/644; 310/322, 334; 367/180
See application file for complete search history.

(56) References Cited
U.S. PATENT DOCUMENTS
2006/0043843 A1  3/2006  Sugiura et al.
FOREIGN PATENT DOCUMENTS
JP    A-10-123236    5/1998
JP    A-2001-232294    8/2001
JP    A-2002-058097    2/2002
JP    A-2002-112392    4/2002
JP    A-2005-024351    1/2005
WO    WO 95/02237    1/1995

OTHER PUBLICATIONS

Kuratli, C. and Qiuting Huang, *A CMOS Ultrasound Range-Finder Microsystem*, IEEE Journal of Solid-State Circuits, vol. 35, No. 12, Dec. 2000, p. 2005-2017.

Office Action dated Mar. 10, 2008 in corresponding German Patent Application No. 10 2006 061 886.6-35 (and English translation).

*Primary Examiner*—John E Chapman
(74) *Attorney, Agent, or Firm*—Posz Law Group, PLC

(57) ABSTRACT

An ultrasonic sensor for detecting an object includes a sending element for sending an ultrasonic wave to the object, a receiving portion for receiving the wave reflected by the object, a first transmitting portion for transmitting a vibration of the wave received by the receiving portion, a second transmitting portion and an oscillating portion which is oscillated by the vibration. The receiving portion is exposed to a space where the object exists. The second transmitting portion is coupled between the first transmitting portion and the oscillating portion so as to transmit the vibration from the first transmitting portion to the oscillating portion.

22 Claims, 7 Drawing Sheets

ULTRASONIC SENSOR

CROSS REFERENCE TO RELATED APPLICATION

This application is based on Japanese Patent Application No. 2006-3512 filed on Jan. 11, 2006, the disclosure of which is incorporated herein by reference.

FIELD OF THE INVENTION

The present disclosure relates to an ultrasonic sensor.

BACKGROUND OF THE INVENTION

An ultrasonic sensor is mounted to an automobile (automotive vehicle), for example. A sending portion in the sensor sends ultrasonic waves to an object to be detected. The object reflects the waves, and a receiving portion in the sensor receives the reflected waves. Thus, a position or a distance for the object around the automobile can be measured. That is, the ultrasonic sensor is used for a safe driving by monitoring surrounding objects of the automobile.

For example, an automatic parking supporting system using an ultrasonic sensor is practically used. In the system, a back-sonar is used for detecting a human or an obstacle existing in the back of an automobile. The ultrasonic sensor is mounted to a rear part of the automobile, and receives ultrasonic waves reflected by the human or the obstacle. Thus, a back side collision with the human or the obstacle can be reduced.

Further, by using a micro electro mechanical system (MEMS) technology, an oscillating portion made of a piezoelectric membrane is formed on a membrane portion in a substrate, as an element for an ultrasonic sensor. Here, when the element is mounted to an automobile in an exposed state, a distance to an object to be detected may not accurately be measured, because water drops or dusts may easily adhere onto a surface of the element. Moreover, the element may be damaged and destroyed by a load of an external force, e.g., a collision with a small stone.

JP-A-2002-58097 discloses an ultrasonic sensor having a protective construction for reducing the adhesion and the destruction. In the sensor, a receiving element is disposed in an aluminum case so as not to be exposed to an outside, and a piezoelectric oscillator for detecting ultrasonic waves is directly mounted to an oscillating board. The sensor can receive ultrasonic waves by oscillations, i.e., vibrations, of the oscillating board.

However, a mechanical strength of the receiving element produced by the MEMS technology is low due to its structure. When the element is directly mounted to the oscillating board, the element may easily be damaged. By contrast, if a space is provided between the piezoelectric membrane and the oscillating board in order to reduce the damage, ultrasonic waves may not effectively be transmitted to the element.

SUMMARY OF THE INVENTION

In view of the foregoing and other problems, it is an object of the present disclosure to provide an ultrasonic sensor. According to the ultrasonic sensor, an oscillating portion of a receiving element can be protected, and ultrasonic waves reflected by an object to be detected can effectively be transmitted to the receiving element.

According to an aspect of the disclosure, an ultrasonic sensor for detecting an object includes a sending element for sending an ultrasonic wave to the object, a receiving portion for receiving the wave reflected by the object, a first transmitting portion for transmitting a vibration of the wave received by the receiving portion, a second transmitting portion and an oscillating portion which is oscillated by the vibration transmitted through the first and second transmitting portions from the receiving portion. The receiving portion is exposed to a space where the object exists. The second transmitting portion is coupled between the first transmitting portion and the oscillating portion so as to transmit the vibration from the first transmitting portion to the oscillating portion.

Accordingly, the oscillating portion can be protected, and the wave reflected by the object can be effectively transmitted to the oscillating portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

An ultrasonic sensor 60 according to this disclosure will be described. The ultrasonic sensor 60 is mounted to an automobile, and used as an obstacle detecting sensor. An upper side of FIG. 2B corresponds to an outside of the automobile. A sending element 19 and an obstacle M are drawn for a description of transmission of ultrasonic waves.

Figure 1A:
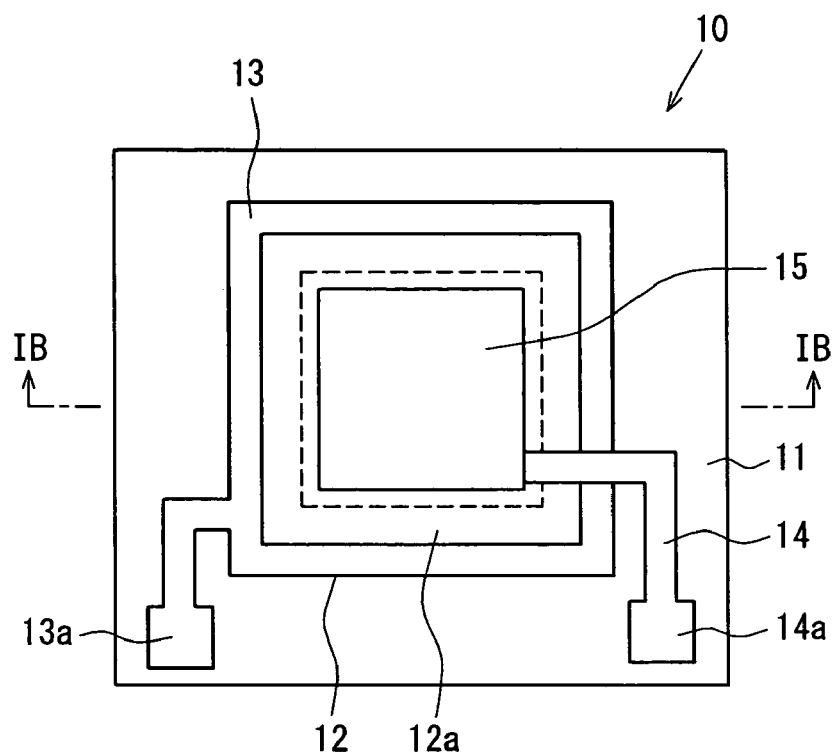
FIG. 1A is a plan view showing a receiving element of an ultrasonic sensor.
Figure 1B:
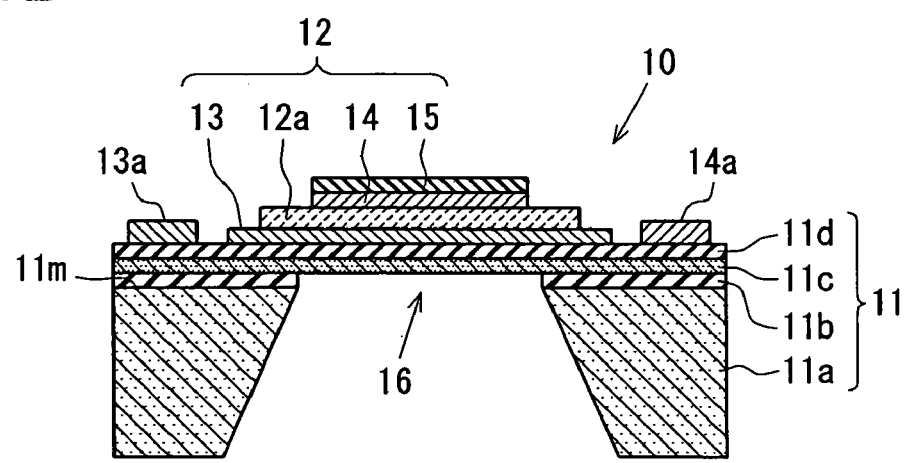
FIG. 1B is a cross-sectional view taken along line IB-IB in FIG. 1A.

First, a structure of a receiving element 10 disposed in the ultrasonic sensor 60 will be described. As shown in FIGS. 1A and 1B, the receiving element 10 is formed by a quadrangular semiconductor substrate 11 having a silicon on insulator (SOI) structure. The substrate 11 is formed by layering a first insulating film 11b, a silicon active layer 11c and a second insulating film 11d in this order on a top face 11m of a supporting portion 11a made of silicon. An approximately center part of the supporting portion 11a and the first insulating film 11b is removed in a quadrangular shape by using a micro electro mechanical system (MEMS) technology in the substrate 11, as shown in FIG. 1B. Thus, the supporting portion 11a is formed into a frame shape, and an approximately center part of the supporting portion 11a and the first insulating film 11b is removed in a square column such that the silicon active layer 11c and the second insulating film 11d are left in a quadrangular membrane shape.

A piezoelectric oscillator 12 is formed on the second insulating film 11d so as to cover the membrane shape. The oscillator 12 is formed by sandwiching a piezoelectric membrane 12a between a bottom electrode 13 and a top electrode 14. For example, the membrane 12a is made of lead zirconate titanate (PZT). The bottom electrode 13 includes a quadrangular part in contact with the piezoelectric membrane 12a, and an electrode pad 13a for obtaining an electric potential. Similarly, the top electrode 14 includes a quadrangular part in contact with the piezoelectric membrane 12a, and an electrode pad 14a for obtaining an electric potential. Each of the electrode pads 13a, 14a is formed around a corner of the substrate 11, as shown in FIG. 1A.

Further, a third insulating film 15 is formed on the top electrode 14. An oscillating portion 16 is formed by a part of the layering of the silicon active layer 11c, the second insulating film 11d, the piezoelectric oscillator 12, the bottom electrode 13, the top electrode 14 and the third insulating film 15. The part corresponds to an inside space, i.e., aperture, of the frame-shaped supporting portion 11a. Ends of the oscillating portion 16 are supported by the supporting portion 11a.

The oscillating portion 16 has a predetermined resonance frequency. Ultrasonic waves are reflected by an object to be detected, and the reflected waves are transmitted to the receiving element 10. Then, the oscillating portion 16 receives the transmitted waves, and resonates with the received waves. A displacement of the oscillating portion 16 due to the resonance is transformed into a voltage signal by the piezoelectric oscillator 12. Thus, the ultrasonic waves can be detected. In the receiving element 10 formed by using the MEMS technology, the oscillating portion 16 is supported by the supporting portion 11a, and a contact part for restraining the oscillating portion 16 is small. Thereby, a displacement of the oscillating portion 16 is increased. Thus, a sensibility for receiving an oscillation, i.e., vibration, can be enhanced. Accordingly, the receiving element 10 is useful due to the remarkable sensitivity.

Figure 2A:
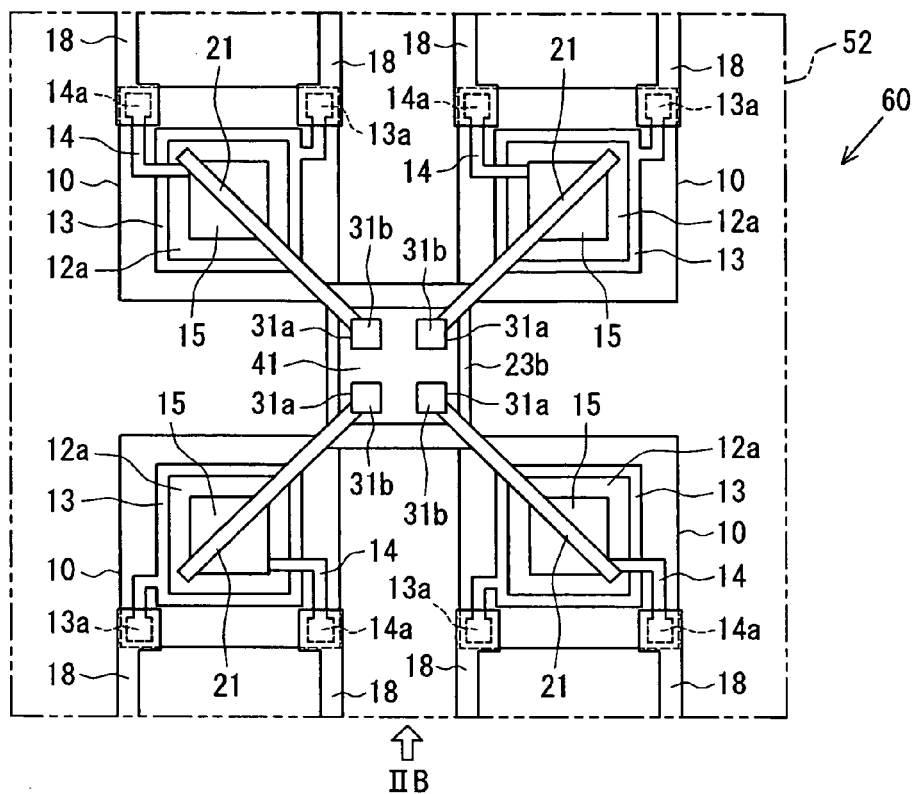
FIG. 2A is a plan view showing the ultrasonic sensor mounted to an automobile.
Figure 2B:
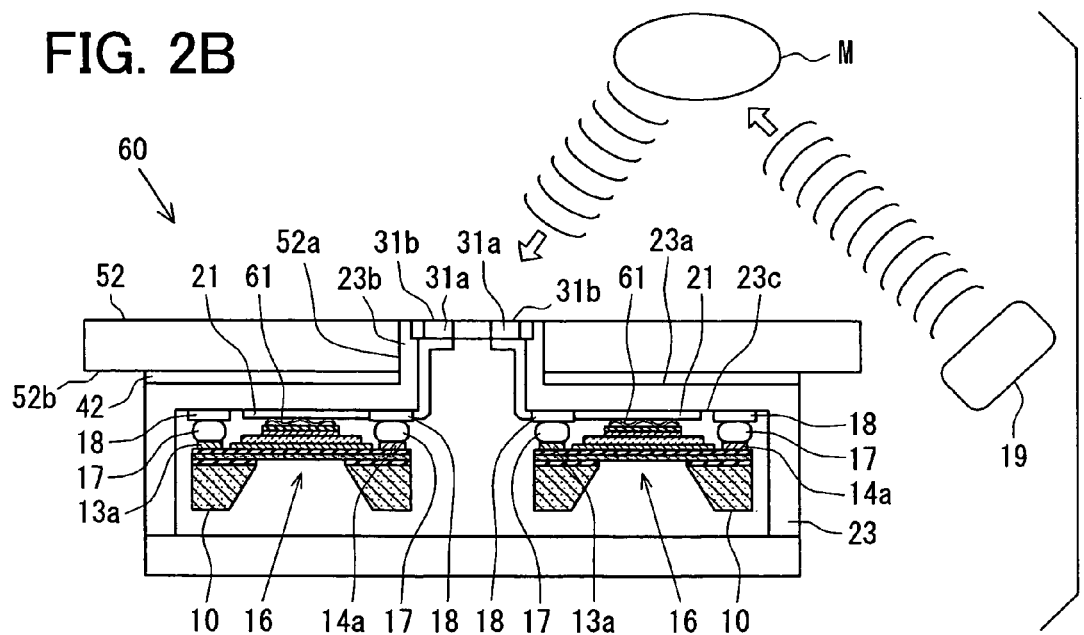
FIG. 2B is a cross-sectional view shown from the arrow IIB direction in FIG. 2A.
Figure 3:
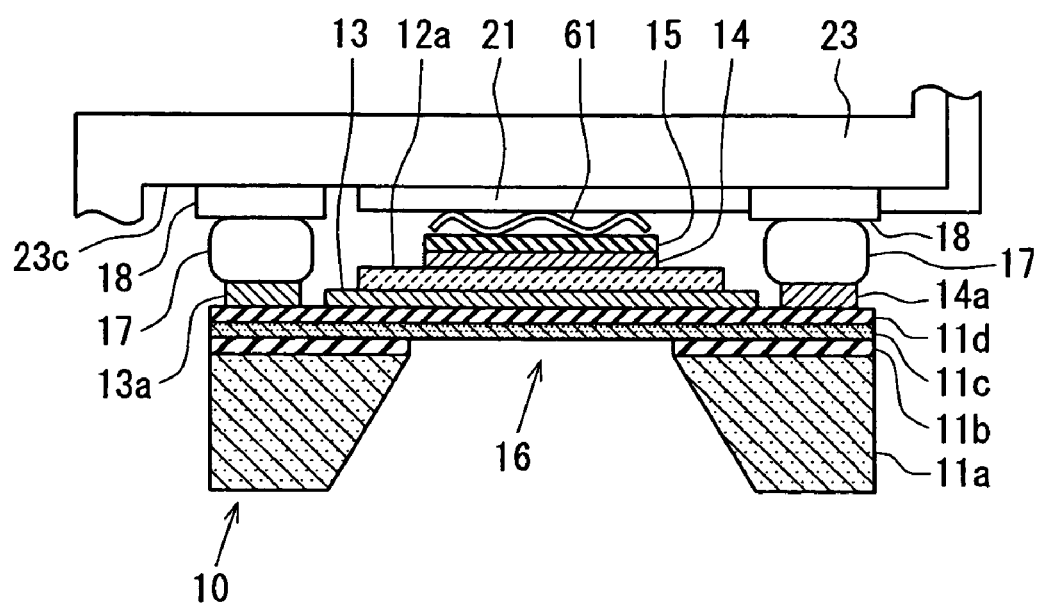
FIG. 3 is an enlarged view of a part of FIG. 2B.

As shown in FIG. 2A, four receiving elements 10 are disposed in a two-by-two array arrangement in the ultrasonic sensor 60. The receiving elements 10 are disposed in a casing 23, as shown in FIG. 2B. The casing 23 is mounted to a reverse face 52b of a bumper 52 disposed in a driving direction. The number of the receiving elements 10 may not be limited to four, and the arrangement of the receiving elements 10 may not be limited to the two-by-two array. The casing 23 is formed into a box shape, and has multiple inner faces, on which the oscillating portions 16 may be mounted. As shown in FIG. 3, electrodes 18 are mounted to an inner face 23c corresponding to the reverse face 52b of the bumper 52, while the casing 23 has the multiple inner faces. The electrode pad 13a is electrically connected to the bottom electrode 13, and the electrode pad 14a is electrically connected to the top electrode 14. Each of the electrodes 13, 14 is electrically connected to the electrode 18 through a conductive bump 17. That is, the receiving element 10 is mounted to the inner face 23c, which is one of the multiple inner faces, because a transmitting time for the inner face 23c is the shortest. The transmitting time represents a time for transmitting ultrasonic waves from a receiving part 31b to the oscillating portion 16. The receiving part 31b will be described below. The bump 17 is a sphere-shaped portion made of metal, for example, and connects each of the electrode pads 13a, 14a to the electrode 18 by a thermal pressing. The electrodes 18 are electrically connected to a circuit (not shown) for detecting a voltage signal output from the oscillator 12, and the circuit is electrically connected to an electronic control unit (ECU, not shown) disposed in an automobile.

As shown in FIGS. 2A and 2B, the casing 23 has a mounting portion 23b for mounting the casing 23 to the bumper 52. The mounting portion 23b is formed into a square column having a quadrangular cross-section, and protruded to a front face of the bumper 52 from the reverse face 52b of the bumper 52. Further, as shown in FIG. 2A, the mounting portion 23b is disposed at an approximately center part of an area surrounded by the four receiving elements 10.

The bumper 52 has a mounting part 52a, to which the mounting portion 23b is mounted. The mounting part 52a passes through the bumper 52 from the reverse face 52b to the front face. The mounting portion 23b of the casing 23 is inserted into the mounting part 52a from the reverse face 52b of the bumper 52. A shock absorber 42 is sandwiched between the reverse face 52b of the bumper 52 and an outer face 23a of the casing 23. Thereby, when the bumper 52 receives an impact, transmission of the impact to the casing 23 can be reduced. Thus, the receiving element 10 disposed in the casing 23 is difficult to be damaged.

Four receiving portions 31a are disposed in the mounting portion 23b of the casing 23. The receiving portions 31a receive ultrasonic waves sent from a sending element 19 and reflected by an object, e.g., obstacle M, to be detected. Each of the receiving portions 31a is made of stainless and formed into a square column. Each of the receiving portions 31a has a quadrangular receiving part 31b for receiving ultrasonic waves. The receiving part 31b is exposed to an outside of the automobile, i.e., a space where the obstacle M exists. The receiving parts 31b are disposed in a two-by-two array arrangement, as shown in FIG. 2A. A shielding portion 41 for reducing transmission of ultrasonic waves is disposed between the receiving portions 31a adjacent to each other, and between the receiving portion 31a and the mounting portion 23b, as shown in FIG. 2A. The receiving portions 31a are disposed such that a distance between center points of the receiving parts 31b adjacent to each other is equal to a half wavelength of an ultrasonic wave.

The arrangement of the receiving portions 31a is determined as described above. However, the receiving elements 10 can be flexibly designed, because a size and an arrangement of the receiving elements 10 are less restricted. Therefore, a design for a resonance can be flexibly performed by changing a size of the receiving element 10. Further, yielding of the receiving elements 10 from one semiconductor wafer can be increased by downsizing the receiving element 10, because the receiving elements 10 are produced by dividing after the oscillating portions 16 are formed on the semiconductor wafer. Thus, productivity of the receiving elements 10 can be improved.

An end of a transmitting portion 21 for transmitting ultrasonic waves received by the receiving part 31b is connected to a reverse face of the receiving portion 31a. As shown in FIGS. 2A and 2B, the other end of the transmitting portion 21 extends along an inner face of the mounting portion 23b and the inner face 23c of the casing 23, and crosses an upper area of the oscillating portion 16.

The transmitting portion 21 is made of a material capable of transmitting an ultrasonic wave as an oscillation of a solid. For example, the transmitting portion 21 is made of a metal foil. The transmitting portion 21 may be connected to a side face of the receiving portion 31a, for example, other than the receiving part 31b.

As shown in FIG. 3, the transmitting portion 21 faces the oscillating portion 16 of the receiving element 10, and a wire 61 is disposed between the transmitting portion 21 and the oscillating portion 16. The wire 61 is in contact with the third insulating film 15, and parallel to a longitudinal direction of the transmitting portion 21. That is, the wire 61 is formed into a linear shape, as shown in FIG. 3. The wire 61 is bonded to the transmitting portion 21 with three bonding points so as to be formed into an arch shape. Curve parts of the arch shape are in contact with the third insulating film 15. The wire 61 is transformable in accordance with displacements by oscillations of ultrasonic waves between the transmitting portion 21 and the oscillating portion 16, because rigidity of the wire 61 is not high due to the arch shape.

The wire 61 is disposed parallel to the longitudinal direction of the transmitting portion 21 in this embodiment. Alternatively, the wire 61 may be disposed in an oblique direction to the longitudinal direction of the transmitting portion 21, and may not be the linear shape. The number of the bonding points to form the arch shape may not be limited to three, as long as the wire 61 is transformable in accordance with displacements by oscillations of ultrasonic waves between the transmitting portion 21 and the oscillating portion 16. The wire 61 may be one of a plurality of wires. In this case, the wires 61 may be disposed parallel to each other, or the wires 61 may cross each other.

As shown in FIG. 2B, after ultrasonic waves sent from the sending element 19 and reflected by the obstacle M to be detected are received by the receiving part 31b, the received ultrasonic waves are transmitted from the receiving portion 31a to the transmitting portion 21 as oscillations of a solid. Then, the waves are transmitted from the transmitting portion 21 through the wire 61, and the oscillating portion 16 in contact with the wire 61 oscillates with the waves. Here, the waves received by the receiving part 31b are transmitted as oscillations of a solid by the transmitting portion 21. Therefore, the waves can be transmitted to the oscillating portion 16 such that attenuation of the oscillation is small. Further, an excessive force is not loaded to the oscillating portion 16, because the wire 61 is transformable in accordance with displacements by oscillations of ultrasonic waves between the transmitting portion 21 and the oscillating portion 16. Thus, the oscillating portion 16 is not damaged by oscillations of ultrasonic waves.

Moreover, attenuation of oscillations can be reduced, because a distance between the receiving part 31b and the oscillating portion 16 is made to be shortest. This is because the receiving element 10 is mounted to the inner face 23c such that a time for transmitting ultrasonic waves received by the receiving part 31b to the oscillating portion 16 is made to be shortest.

Oscillations of ultrasonic waves are transmitted from the transmitting portion 21 through the wire 61 to the oscillating portion 16, and the oscillating portion 16 oscillates with the waves. Then, a voltage signal is output from the oscillator 12 into the circuit. The circuit transforms the voltage signal output from the oscillator 12 into a signal processable in the ECU. Next, the circuit outputs the signal into the ECU, and the ECU performs a predetermined calculation based on the signals. For example, a time difference and a phase difference between an ultrasonic wave sent from the sending element 19 and an ultrasonic wave received by the receiving element 10 are calculated. Thus, a distance to the obstacle M and a position of the obstacle M can be determined based on the differences.

Here, when the receiving portions 31a are disposed such that a distance between center points of the receiving parts 31b adjacent to each other is equal to a half wavelength of an ultrasonic wave, the time difference can also be calculated based on the phase difference. Therefore, a time difference between ultrasonic waves received by each of the receiving parts 31b can be accurately detected. Accordingly, accuracy for measuring the distance to the obstacle M and the position of the obstacle M can be improved.

Ultrasonic waves are not transmitted from one of the receiving portions 31a to other receiving portions 31a, because the shielding portion 41 is sandwiched between the receiving portions 31a. Therefore, ultrasonic waves received by the receiving part 31b, which is at left side in FIG. 2B, are transmitted only to the oscillating portion 16 of the receiving element 10, which is at left side in FIG. 2B. Thereby, transmission of ultrasonic waves can be separately performed between the receiving portions 31a. Thus, a cross-talk reduction characteristic of each of the oscillating portions 16 can be improved. Accordingly, accuracy for measuring the position of the obstacle M can be improved, because the time difference and the phase difference are accurately calculated.

A transmitting time of an ultrasonic wave received by the receiving part 31b from the receiving part 31b to the oscillating portion 16 is made to be uniform among combinations of the receiving part 31b and the oscillating portion 16. Therefore, accuracy for measuring a time difference between ultrasonic waves received by each of the receiving parts 31b can be improved, when a position of the obstacle M is measured. Accordingly, accuracy for measuring the position of the obstacle M can be improved. In order to make the transmitting times uniform among the combinations of the receiving part 31b and the oscillating portion 16, for example, a distance between the receiving part 31b and the oscillating portion 16, which are corresponding to the same receiving element 10, is made to be uniform among the combinations.

The receiving portion 31a is made of a weatherproof material, because the receiving portion 31a is exposed to an outside air. Further, in order to improve efficiency for transmitting an oscillation, a material having a low oscillation-attenuating performance is used for forming the receiving portion 31a. Based on the above reasons, the receiving portion 31a may be made of a metal material, e.g., aluminum alloy, other than the stainless. Further, a variety of synthetic resins, glass, ceramics or rubber may be used for forming the receiving portion 31a.

The transmitting portion 21 is made of any material capable of efficiently transmitting an oscillation of the receiving portion 31a, such as glass, ceramics or resin. The transmitting portion 21 is formed into any shape capable of efficiently transmitting an oscillation of the receiving portion 31a, such as a bar or a board. Further, when acoustic impedances are made to be the same between the transmitting portion 21 and the wire 61, attenuation of an oscillation can be reduced at an interface of the transmitting portion 21 and the wire 61. For example, the transmitting portion 21 and the wire 61 are made of the same material. Furthermore, in order to increase a transmitting efficiency, the transmitting portion 21 is disposed in a linear shape, and a corner of the transmitting portion 21 is made to be round.

Figure 4A:
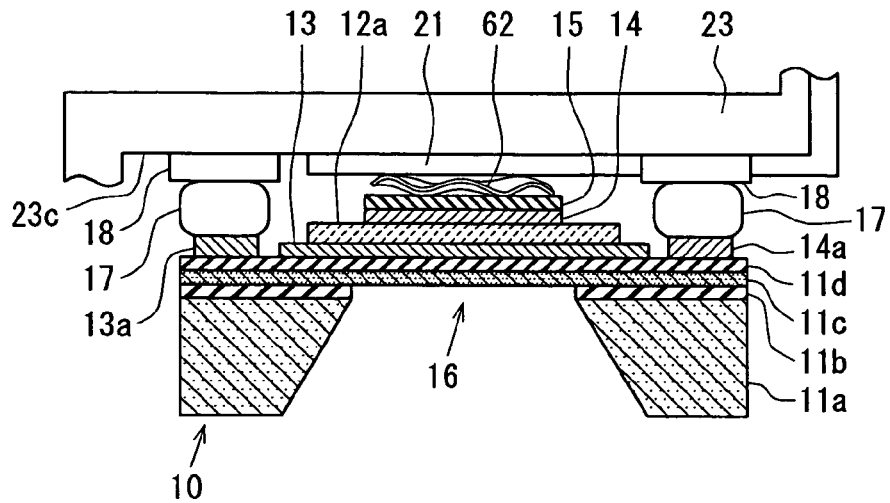
FIGS. 4A-4C are cross-sectional views showing modifications of a member for transmitting an oscillation from a transmitting portion to an oscillating portion.

A first modified example will be described with reference to FIG. 4A. In this example, an ultrasonic sensor is mounted to an automobile, and used for an obstacle detecting sensor. As shown in FIG. 4A, a foil portion 62 made of metal or resin may be formed into a wave shape, and disposed between the transmitting portion 21 and the oscillating portion 16 in place of the wire 61 such that tops of the wave are in contact with the oscillating portion 16. The foil portion 62 may be formed into a tube shape, for example, other than the wave shape. In this case, the tube is disposed such that an outer face of the tube extends along the transmitting portion 21.

According to the first modified example, the foil portion 62 can have a larger contact area with the oscillating portion 16 and the transmitting portion 21 than the wire 61, because a width of the foil portion 62 is wider than that of the wire 61. Thus, efficiency for transmitting an oscillation can be improved. Further, an excessive force is not loaded on the oscillating portion 16, because the foil portion 62 is transformable in accordance with displacements by oscillations of ultrasonic waves between the transmitting portion 21 and the oscillating portion 16. Therefore, the oscillating portion 16 is difficult to be damaged by the oscillations.

Figure 4B:
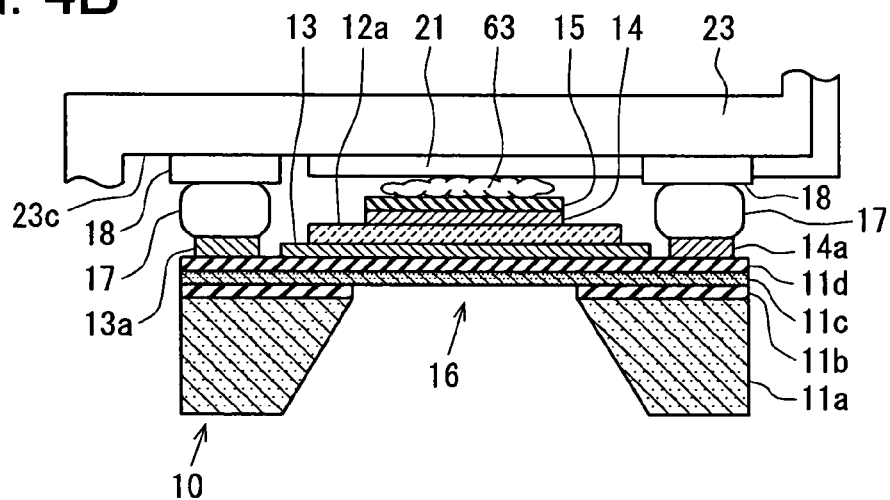
Figure 4C:
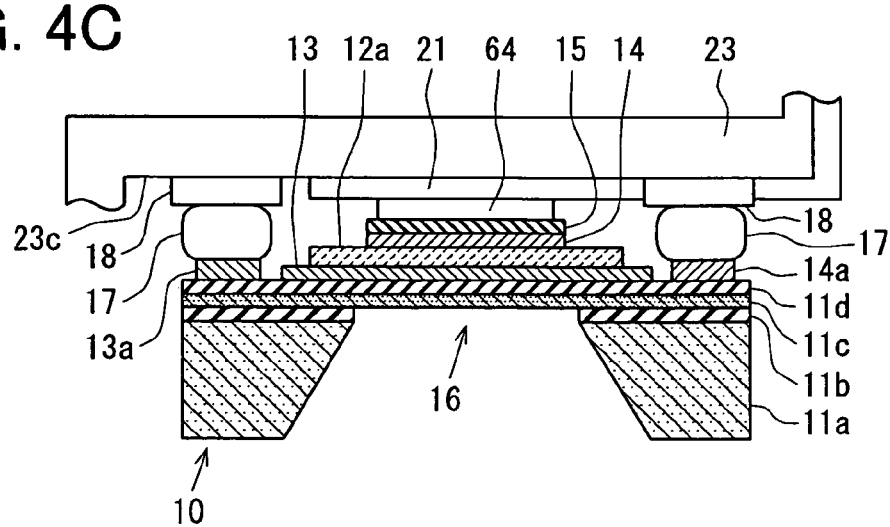

A second modified example will be described with reference to FIGS. 4B and 4C. As shown in FIG. 4B, an elastic floc portion 63 made of metal or resin may be disposed between the transmitting portion 21 and the oscillating portion 16. Further, as shown in FIG. 4C, a gel portion 64, e.g., polymer gel, may be disposed between the transmitting portion 21 and the oscillating portion 16. In these cases, each of the floc portion 63 and the gel portion 64 can have a large contact area with the transmitting portion 21 and the oscillating portion 16. Therefore, efficiency for transmitting oscillations can be improved. Further, an excessive force is not loaded on the oscillating portion 16, because each of the floc portion 63 and the gel portion 64 is transformable in accordance with displacements by oscillations of ultrasonic waves between the transmitting portion 21 and the oscillating portion 16. Therefore, the oscillating portion 16 is difficult to be damaged by the oscillations.

Figure 5A:
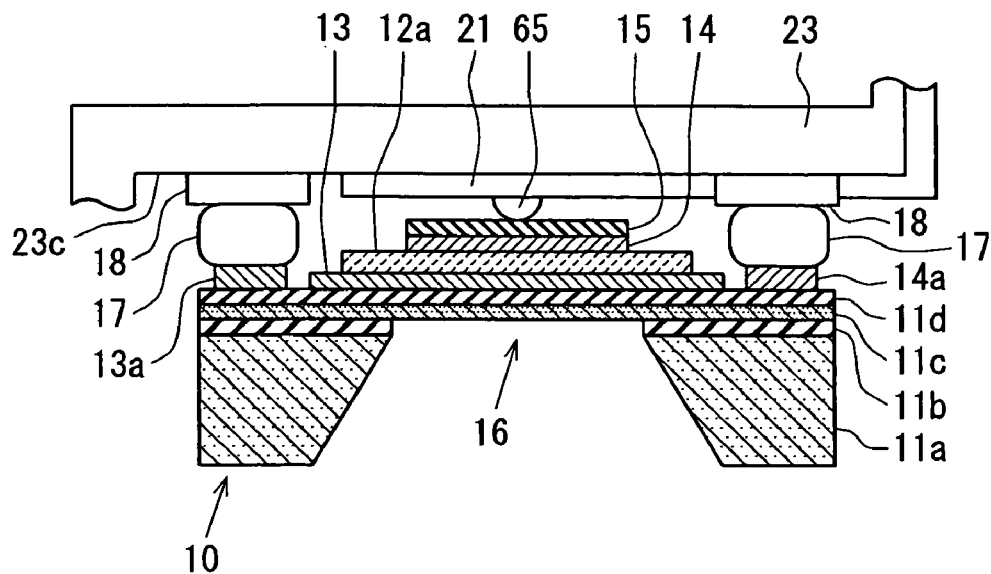
FIGS. 5A and 5B are cross-sectional views showing modifications of a member for transmitting an oscillation from a transmitting portion to an oscillating portion.

A third modified example will be described with reference to FIGS. 5A and 5B. As shown in FIG. 5A, a half-sphere protruding portion 65 may be disposed such that a flat face of the protruding portion 65 is in contact with the transmitting portion 21 and that a sphere face of the protruding portion 65 is in contact with an approximately center part of the oscillating portion 16. The protruding portion 65 may be formed by making a part of the transmitting portion 21 to be protruded. Alternatively, the protruding portion 65 may be made of resin or adhesive. Further, the protruding portion 65 may be a rectangular column or a circular cylinder other than the half-sphere. Furthermore, multiple protruding portions 65 may be disposed between the transmitting portion 21 and the oscillating portion 16.

Figure 5B:
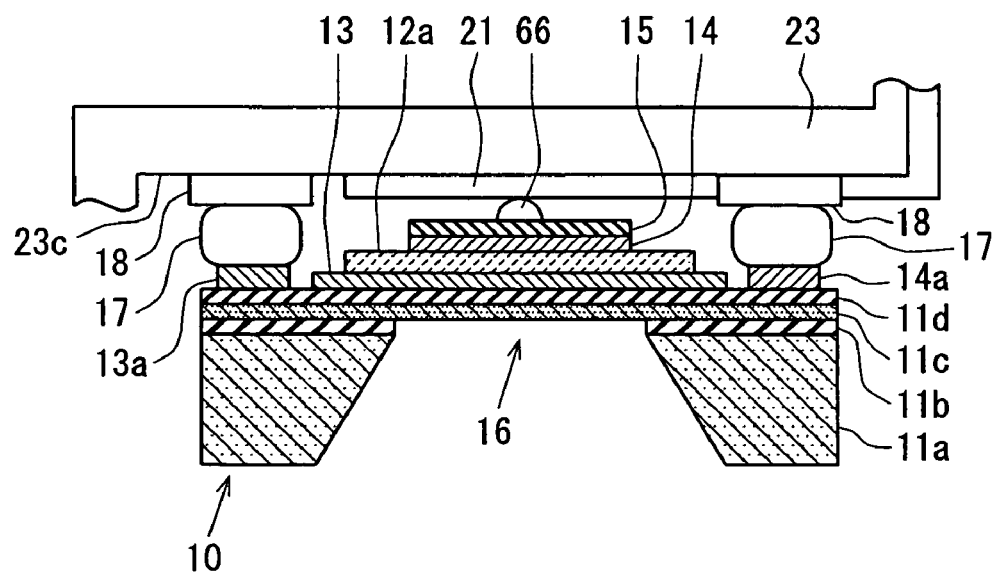

Moreover, as shown in FIG. 5B, a half-sphere protruding portion 66 may be disposed such that a flat face of the protruding portion 66 is in contact with an approximately center part of the third insulating film 15 of the oscillating portion 16 and that a sphere face of the protruding portion 66 is in contact with the transmitting portion 21. The protruding portion 66 may be made of resin or adhesive. Further, the protruding portion 66 may be a rectangular column or a circular cylinder other than the half-sphere. Furthermore, multiple protruding portions 66 may be disposed between the transmitting portion 21 and the oscillating portion 16.

In these cases, an area in contact with the oscillating portion 16 is small such that a part for restraining oscillations is reduced, because ultrasonic waves are locally transmitted through each of the protruding portions 65, 66 as oscillations of a solid. Therefore, efficiency for transmitting oscillations can be improved, because displacements of the oscillating portion 16 are increased. Further, each of the protruding portions 65, 66 is transformable in accordance with displacements by oscillations of ultrasonic waves between the transmitting portion 21 and the oscillating portion 16. Therefore, the oscillating portion 16 is difficult to be damaged by the oscillations, because an excessive force is not loaded on the oscillating portion 16.

Figure 6A:
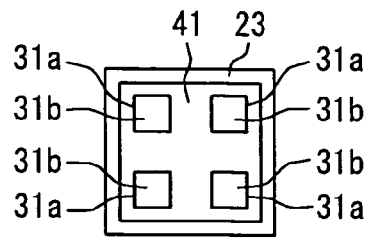
FIGS. 6A-6C are plan views showing modified receiving portions.
Figure 6D:
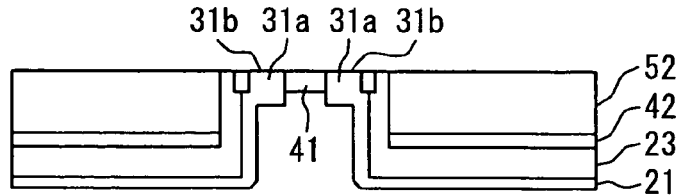
FIGS. 6D-6F are cross-sectional views showing the modified receiving portions respectively corresponding to FIGS. 6A-6C.

A fourth modified example will be described with reference to FIGS. 6A-6F. As shown in FIGS. 6A and 6D, the receiving portion 31a and the transmitting portion 21 may be integrally formed with the same material. In this case, attenuation of oscillations can be decreased, because oscillations can be directly transmitted from the receiving portion 31a to the transmitting portion 21. Further, the number of portions constructing the receiving element 10 can be decreased.

Figure 6B:
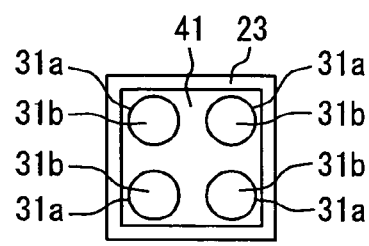
Figure 6E:
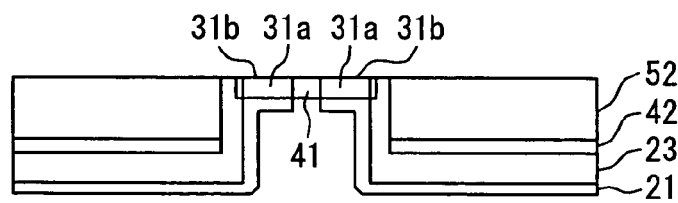

As shown in FIGS. 6B and 6E, the receiving part 31b may have a circular cross-section. Moreover, the receiving part 31b may have a star-shaped cross-section. In these cases, a quality for a design of the receiving part 31b can be improved.

Figure 6C:
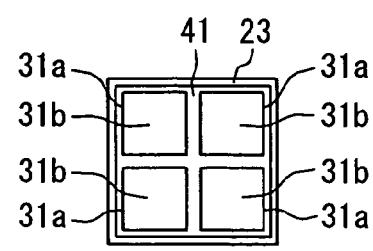
Figure 6F:
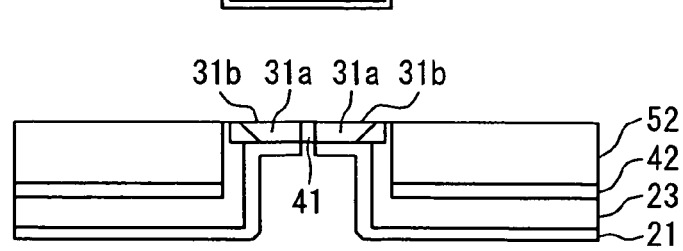

As shown in FIGS. 6C and 6F, an area of the receiving part 31b may be made to be larger than a cross-sectional area of a part for connecting the transmitting portion 21. In this case, sensitivity for receiving ultrasonic waves can be improved, because an area for receiving ultrasonic waves can be increased. In any case described above using FIGS. 6A-6F, a distance between center points of the receiving parts 31b adjacent to each other is equal to a half wavelength of an ultrasonic wave.

Figure 7A:
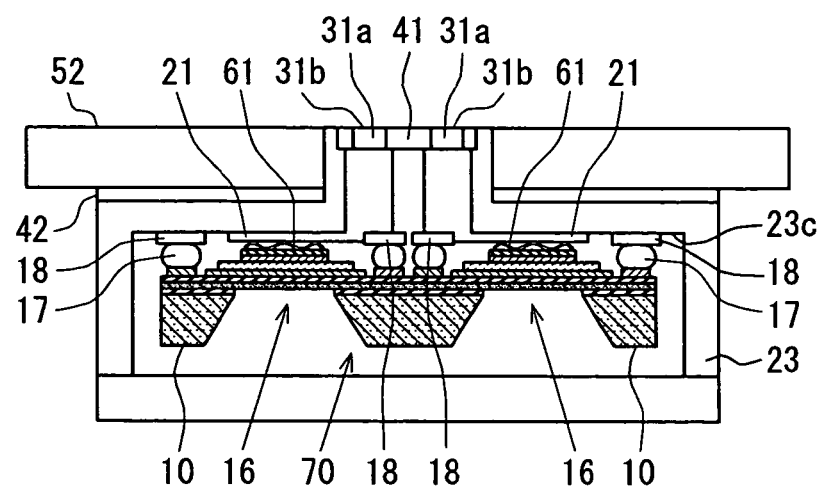
FIGS. 7A and 7B are cross-sectional views showing modified arrangements of receiving elements.

A fifth modified example will be described with reference to FIG. 7A. As shown in FIG. 7A, multiple, e.g., four, receiving elements 10 may be integrated into a chip 70. In this case, a space for arranging the elements 10 can be decreased, because the receiving elements 10 are integrated. Further, a number of processes for producing ultrasonic sensors 60 can be decreased, because the elements 10 are not divided and not redisposed.

Figure 7B:
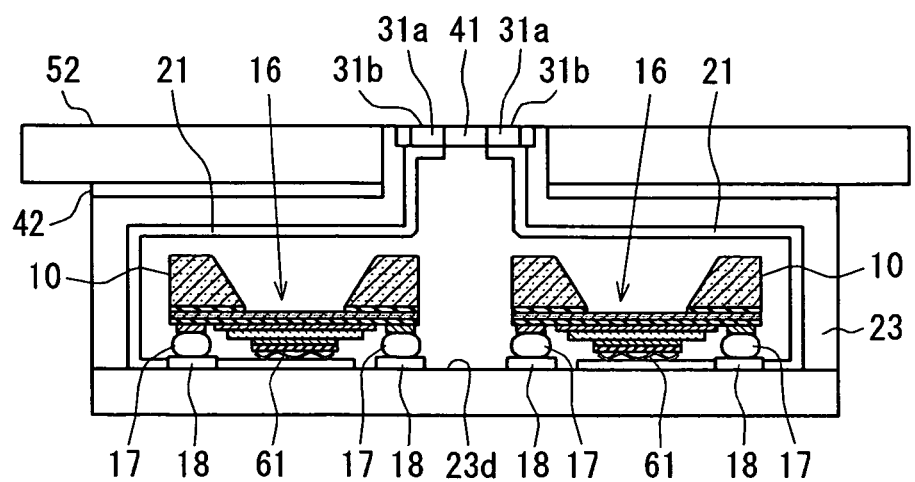

A sixth modified example will be described with reference to FIG. 7B. As shown in FIG. 7B, a position for mounting the receiving element 10 is not limited to the inner face 23c. Alternatively, the receiving element 10 may be mounted to another inner face 23d. When the receiving element 10 is mounted to the inner face 23d, while the casing 23 has multiple inner faces, a time for transmitting an oscillation of an ultrasonic wave received by the receiving part 31b to the oscillating portion 16 becomes longest. In this case, even when the bumper 52 receives an impact, the receiving element 10 is difficult to be damaged, because the receiving element 10 is disposed at farthest position from the bumper 52.

The ultrasonic sensor 60 may be mounted to an end portion in a driving direction of an automobile, other than the bumper 52. For example, the sensor 60 may be mounted to a body directly above or beneath the bumper 52. In this case, ultrasonic waves reflected by the obstacle M are not shielded by a part of the automobile so as to accurately be detected by the ultrasonic sensor 60. Therefore, the ultrasonic sensor 60 can be effectively used for an obstacle detecting sensor. Moreover, the sensor 60 may be mounted to other portions based on a usage of the sensor 60. For example, when the sensor 60 is used as an obstacle detecting sensor on a side face of an automobile, the sensor 60 may be mounted to a door mirror or a cover of a winker disposed on the side face.

When each of the wire 61, the foil portion 62, the floc portion 63, the gel portion 64 and the protruding portions 65, 66 is made of an insulating material, the third insulating film 15 may not be formed in the receiving element 10. Moreover, the receiving element 10 is not limited to the piezoelectric receiving element. Alternatively, a capacitance receiving element may be used as the receiving element 10. The capacitance receiving element detects an ultrasonic wave by a change of a capacitance between electrodes. Furthermore, a cantilevered element may be used as the receiving element 10.

According to this embodiment, ultrasonic waves sent from the sending element 19 and reflected by the obstacle M are received by the receiving portion 31a. The receiving portion 31a is disposed on the bumper 52, and the receiving part 31b is exposed to a space where the obstacle M exists. Ultrasonic waves received by the receiving portion 31a are transmitted to the oscillating portion 16 through the transmitting portion 21 and the wire 61 as oscillations of a solid. Therefore, attenuation of the waves can be smaller compared with a case in which the waves are transmitted through air. Thus, oscillations of ultrasonic waves can be effectively transmitted to the oscillating portion 16.

Further, the oscillating portion 16 is not directly exposed to an outside, and the receiving portion 31a and the oscillating portion 16 are connected through the transmitting portion 21 and the wire 61. Therefore, when the receiving portion 31a is displaced toward the oscillating portion 16 due to an external force, the oscillating portion 16 is difficult to be damaged by a contact with the receiving portion 31a. That is, in the ultrasonic sensor 60, the oscillating portion 16 is protected, and ultrasonic waves reflected by the obstacle M are effectively transmitted to the oscillating portion 16.

An excessive force is not loaded to the oscillating portion 16, because portions for transmitting oscillations, e.g., wire 61, are transformable in accordance with displacements between the transmitting portion 21 and the oscillating portion 16. Therefore, the oscillating portion 16 is difficult to be damaged by oscillations of ultrasonic waves.

A time difference and a phase difference of ultrasonic waves received by the oscillating portions 16 can be calculated, because the ultrasonic sensor 60 includes the multiple oscillating portions 16. Thereby, a distance to the obstacle M and a position for an object to be detected can be measured based on the differences.

Ultrasonic waves can be separately transmitted between the receiving portions 31a, because ultrasonic waves received by each of the receiving portions 31a are transmitted only to the corresponding oscillating portion 16. Therefore, cross-talk reduction characteristic of each of the oscillating portions 16 can be improved. Thereby, the time difference and the phase difference are accurately calculated. Accordingly, accuracy for measuring the position of the obstacle M can be improved.

All of the oscillating portions 16 are disposed in the same casing 23. Therefore, only the casing 23 is mounted to the mounting part 52a of the bumper 52, in order to mount the ultrasonic sensor 60 to an automobile. Thus, the oscillating portions 16 are difficult to be damaged by a collision with the mounting part 52a. Further, position adjustments for the casing 23 and the receiving part 31b to an automobile are easy, because the casing 23 is mounted to the mounting part 52a such that the receiving parts 31b are exposed to a space where the obstacle M exists. Furthermore, a time for mounting can be shortened, because the multiple oscillating portions 16 can be mounted at one time by mounting the casing 23 to the mounting part 52a of the bumper 52.

The ultrasonic sensor 60 can be used as an obstacle sensor for detecting an obstacle or a human around an automobile. Further, the receiving portion 31a and the oscillating portion 16 are connected through the transmitting portion 21 and the wire 61. Therefore, when a small stone is collided with the receiving portion 31a in a driving time, the oscillating portion 16 is difficult to be damaged by a contact with the receiving portion 31a. Furthermore, when raindrops and dusts adhere onto an automobile, the oscillating portion 16 is not covered with the raindrops and the dusts. Therefore, the ultrasonic sensor 60 can accurately operate in this case. That is, the ultrasonic sensor 60 can be mounted to an automobile, and can be used with a high reliability.

Alternatively, the oscillating portion 16 may be mounted to the inner face 23c of the casing 23 such that a transmitting time for transmitting the vibration from the receiving part 31b to the oscillating portion 16 is shorter than a predetermined time.

Alternatively, the oscillating portion 16 may be mounted to the inner face 23d of the casing 23 such that a transmitting time for transmitting the vibration from the receiving part 31b to the oscillating portion 16 is longer than a predetermined time.

Alternatively, the sensor 60 may include a plurality of sets, in which each set includes the receiving portion 31a, the oscillating portion 16, the first transmitting portion 21 and the wire 61.

While the invention has been described with reference to a preferred embodiment thereof, it is to be understood that the invention is not limited to the preferred embodiment and constructions. The invention is intended to cover various modification and equivalent arrangements. The invention is intended to cover various combinations and configurations, which are preferred, other combinations and configurations, including more, less or only a single element, are also within the spirit and scope of the invention.

What is claimed is:

1. An ultrasonic sensor for detecting an object, the ultrasonic sensor comprising:
   a sending element for sending an ultrasonic wave to the object;
   a receiving portion for receiving the ultrasonic wave reflected by the object, wherein the receiving portion is exposed to a space where the object exists;
   a first transmitting portion for transmitting a vibration of the ultrasonic wave received by the receiving portion, wherein the first transmitting portion is connected to the receiving portion;
   a second transmitting portion; and
   an oscillating portion which is oscillated by the vibration transmitted through the first and second transmitting portions from the receiving portion, wherein
   the second transmitting portion is coupled between the first transmitting portion and the oscillating portion so as to transmit the vibration from the first transmitting portion to the oscillating portion, and is transformable to protect the oscillating portion from a force of the vibration received from the first transmitting portion.

2. The ultrasonic sensor according to claim 1, wherein:
   the second transmitting portion includes a wire-shaped member.

3. The ultrasonic sensor according to claim 1, wherein:
   the second transmitting portion includes a foil-shaped member.

4. The ultrasonic sensor according to claim 1, wherein:
   the second transmitting portion includes a floc-shaped member.

5. The ultrasonic sensor according to claim 1, wherein:
   the second transmitting portion includes a member made of gel.

6. The ultrasonic sensor according to claim 1, wherein:
   the second transmitting portion includes a protruding portion, which protrudes from the first transmitting portion so as to be in contact with the oscillating portion.

7. The ultrasonic sensor according to claim 1, wherein:
   the second transmitting portion includes a protruding portion, which protrudes from the oscillating portion so as to be in contact with the first transmitting portion.

8. The ultrasonic sensor according to claim 1, further comprising:
   a supporting portion for holding an end of the oscillating portion.

9. The ultrasonic sensor according to claim 1, wherein:
the receiving portion and the first transmitting portion are integrated.

10. The ultrasonic sensor according to claim 1, wherein:
the first transmitting portion has an acoustic impedance, which is equal to or approximately equal to an acoustic impedance of the second transmitting portion.

11. The ultrasonic sensor according to claim 1, further comprising:
a casing, in which the oscillating portion is disposed, wherein
the casing is mounted to a portion of a predetermined apparatus in such a manner that the receiving portion is exposed to the space where the object exists.

12. The ultrasonic sensor according to claim 11, wherein:
the oscillating portion is mounted to an inner face of the casing such that the first transmitting portion has a length, which is equal to or shorter than a predetermined length, such that a transmitting time for transmitting the vibration from the receiving portion to the oscillating portion is shorter than a predetermined time.

13. The ultrasonic sensor according to claim 11, wherein:
the oscillating portion is mounted to an inner face of the casing such that the first transmitting portion has a length, which is equal to or shorter than a predetermined length, such that a transmitting time for transmitting the vibration from the receiving portion to the oscillating portion is longer than a predetermined time.

14. The ultrasonic sensor according to claim 11, further comprising:
a shock absorber, which is disposed between the casing and the predetermined apparatus, for intercepting a shock received by the predetermined apparatus from transmitting to the casing.

15. The ultrasonic sensor according to claim 1, further comprising:
a plurality of sets
each including one of the receiving portion, the oscillating portion, the first transmitting portion and the second transmitting portion.

16. The ultrasonic sensor according to claim 15, further comprising:
a shielding portion for intercepting transmission of the vibration among the receiving portions of the sets.

17. The ultrasonic sensor according to claim 15, wherein:
each of the first transmitting portions has a length, which is approximately the same, such that each of the sets has a transmitting time, which is approximately the same, for transmitting a vibration received by the receiving portion from the receiving portion to the oscillating portion.

18. The ultrasonic sensor according to claim 15, further comprising:
a casing, in which all of the oscillating portions of the sets are disposed, wherein
the casing is mounted to a mounting portion of a predetermined apparatus in such a manner that the receiving portions of the sets are exposed to the space where the object exists.

19. The ultrasonic sensor according to claim 18, wherein:
each of the oscillating portions is mounted to an inner face of the casing such that the first transmitting portion has a length, which is equal to or shorter than a predetermined length, such that a transmitting time for transmitting the vibration from the receiving portion to the oscillating portion is shorter than a predetermined time.

20. The ultrasonic sensor according to claim 18, wherein:
each of the oscillating portions is mounted to an inner face of the casing such that the first transmitting portion has a length, which is equal to or shorter than a predetermined length, such that a transmitting time for transmitting the vibration from the receiving portion to the oscillating portion is longer than a predetermined time.

21. The ultrasonic sensor according to claim 18, further comprising:
a shock absorber, which is disposed between the casing and the predetermined apparatus, for intercepting a shock received by the predetermined apparatus from transmitting to the casing.

22. The ultrasonic sensor according to claim 1, further comprising:
a mounting portion for being mounted to an automotive vehicle.

* * * * *